United States Patent [19]

Steeber et al.

[11] Patent Number: 5,601,180

[45] Date of Patent: Feb. 11, 1997

[54] CONVEYOR APPARATUS HAVING A BELT AND OBJECT GUIDE WITH A NODULAR CONTACT SURFACE

[76] Inventors: Dorian F. Steeber, 14 Mountain Vista Rd., Taylors, S.C. 29687; Robert E. Reaser, 203 Sugar Creek La., Greer, S.C. 29650; William G. Faulkner, 6701 Newman Dr., Oklahoma, Okla. 73162

[21] Appl. No.: 582,860

[22] Filed: Jan. 4, 1996

Related U.S. Application Data

[63] Continuation-in-part of Ser. No. 488,645, Jun. 8, 1995.

[51] Int. Cl.⁶ .................................................. B65G 43/00
[52] U.S. Cl. ................... 198/502.1; 198/841; 198/836.1
[58] Field of Search ............................... 198/502.1, 841, 198/836.1

[56] References Cited

U.S. PATENT DOCUMENTS

| | | | |
|---|---|---|---|
| 2,169,772 | 8/1939 | Schweitzer | 198/841 X |
| 2,866,538 | 12/1958 | Goldberg | 198/841 |
| 3,711,090 | 1/1973 | Fiedler | 198/841 X |
| 5,277,246 | 1/1994 | Monch | 198/841 X |
| 5,311,979 | 5/1994 | Risley et al. | 198/836.1 X |
| 5,316,134 | 5/1994 | Donohue | 198/836.1 X |

FOREIGN PATENT DOCUMENTS

| | | | |
|---|---|---|---|
| 2672877 | 8/1992 | France | 198/841 |

OTHER PUBLICATIONS

Brochure entitled *Conveyor Components Valu Guide*, Valu Engineering, Irvine, California (Bulletin G103) (not dated).
Modular Belting catalog, Falcon Belting, Inc., Oklahoma City, Oklahoma, copyright Jan. 1994.

*Primary Examiner*—D. Glenn Dayoan
*Attorney, Agent, or Firm*—Dunlap & Codding, P.C.

[57] ABSTRACT

A conveyor apparatus of the type in which an object is transported on a conveyor belt and in which the conveyor belt slidingly engages a guide member, the guide member having a plurality of nodules extending therefrom so as to form a plurality of channels and define a low friction contact surface for reducing drag between the conveyor belt and the contact surface when the conveyor belt is set in motion. The low friction contact surface of the guide member also is slidingly engagable with the object when the guide member is used as a side rail.

27 Claims, 8 Drawing Sheets

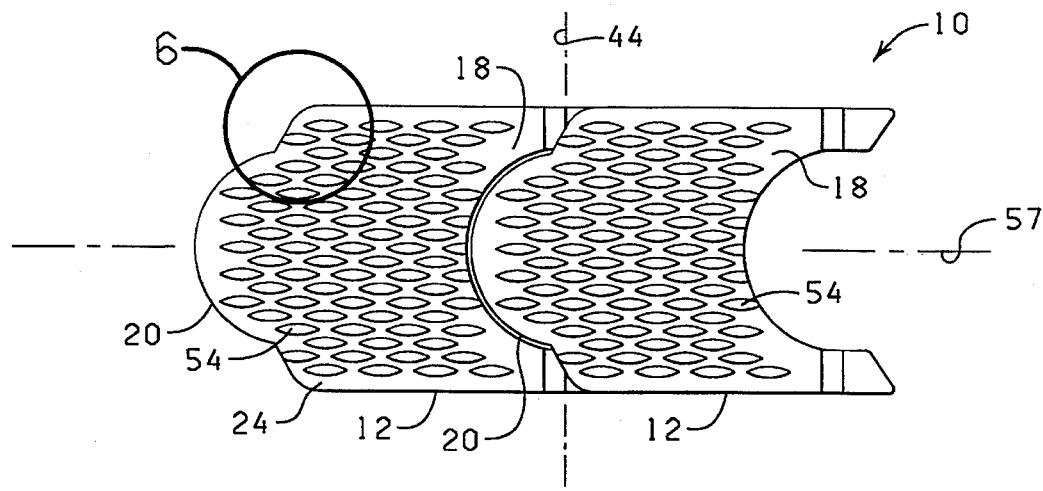
FIG. 1
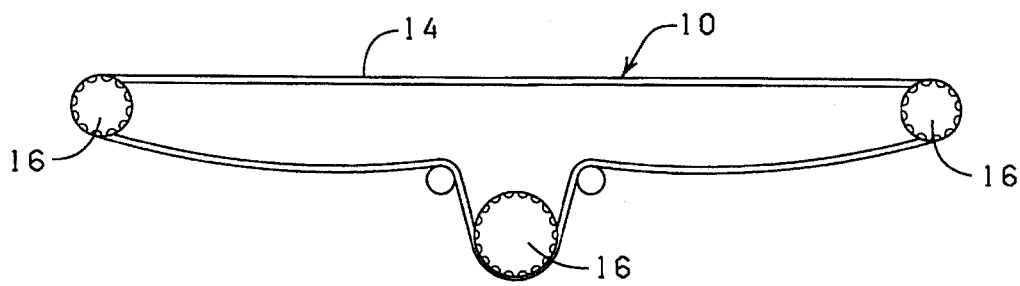
FIG. 2
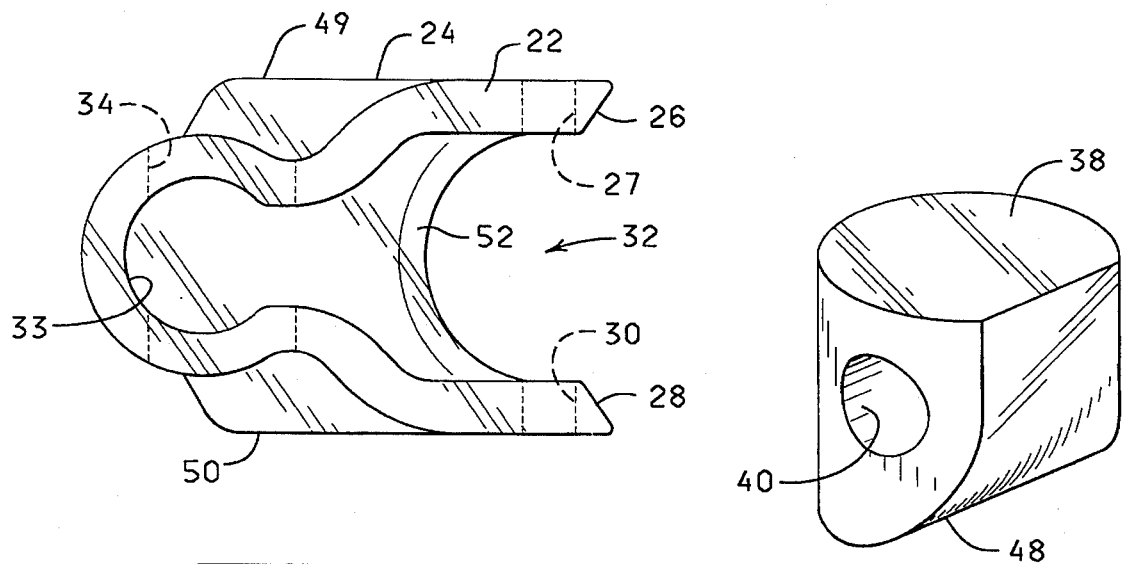
FIG. 3
FIG. 4

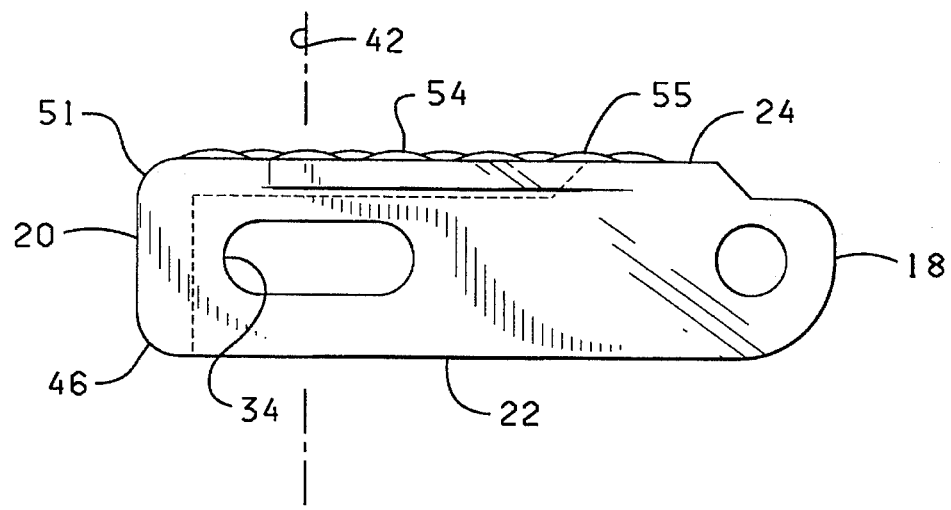
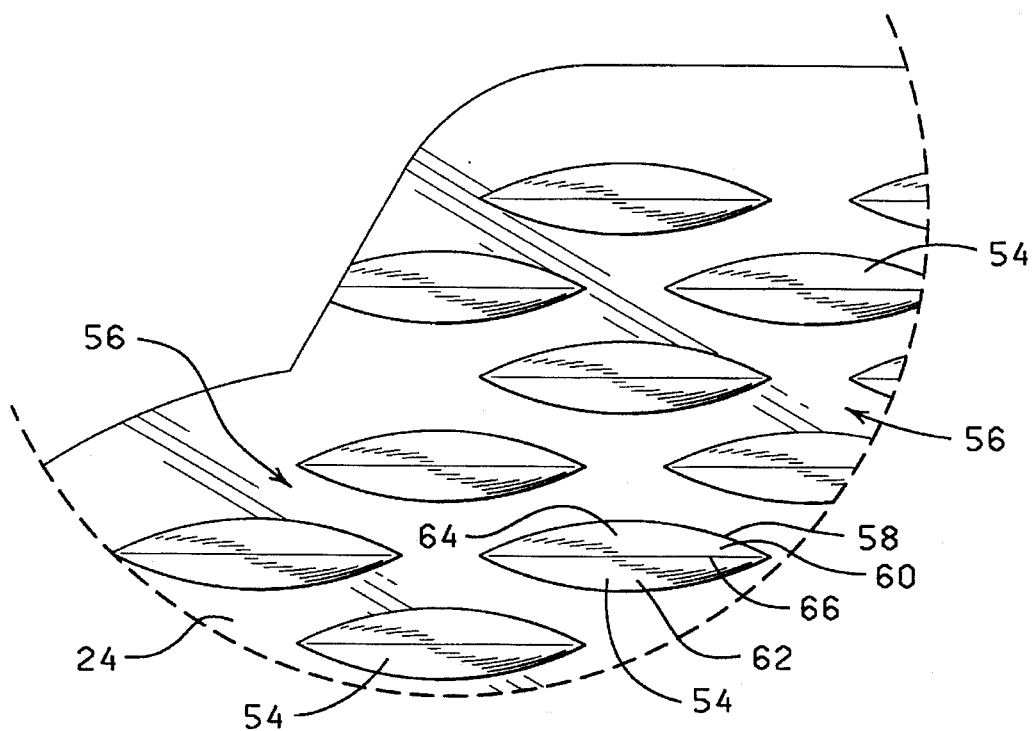

CONVEYOR APPARATUS HAVING A BELT AND OBJECT GUIDE WITH A NODULAR CONTACT SURFACE

CROSS REFERENCE TO RELATED APPLICATIONS

This application is a continuation-in-part of U.S. Ser. No. 08/488,645, filed Jun. 9, 1995, entitled CONVEYOR APPARATUS HAVING A NODULAR CONVEYING SURFACE.

BACKGROUND OF THE INVENTION

1. Field of the Invention.

The present invention relates generally to conveyor apparatuses, and more particularly, but not by way of limitation, to a conveyor apparatus having a contact surface with a plurality of nodules formed thereon to provide a low friction surface that remains substantially free of debris.

2. Description of Related Art.

Many types of products are transported through a plant on a conveyor belt or a conveyor chain during the processing and packaging of the products. To this end, numerous types of conveyor belts and conveyor chains exist for transporting different products and accommodating the specific processing requirements of certain products. For example, flat wire belts are useful for transporting products that must be washed or dried in that water and air are able to pass freely through the wire belt. On the other hand, belts and chains with a continuous conveying surface are often used to transport meat, poultry, and beverage containers.

Particularly, when processing beverages, it is often required that the containers be backed up at certain points along the line. In these instances, the conveyor belt or chain continues to slide under the slower moving or stationary containers. A problem often encountered, however, is that the friction between the bottom of the containers and the conveying surface increases due to an increase in pressure caused by the accumulation of the containers or the gathering of debris on the conveying surface. The increased friction can result in product damage from wear on the product contact surface, deformation of flexible containers, and breakage of rigid containers due to excessive line pressure. In addition, the phenomena of "bridging" or "shingling" on containers is greatly increased with increased line pressure (friction) causing containers to lock together on the line, stopping production until a manual or mechanical unlocking occurs, and sometimes requiring the conveyor to be shut off to prevent damage to the containers.

To decrease the friction between the bottom of the containers and the conveying surface, the use of water, soap, various lubricants, or specially compounded surfactants is common on current designs of conveyor surfaces. These methods are undesirable because of the added cost to the operation and the complication of the proper disposal of the waste liquids. In addition, some container materials such as paper based laminates, and container decorations, such as labels, marking inks, and container attachments, such as instruction booklets, straws, and promotional coupons are damaged by the presence of these substances on the line. As such, most industries prefer that their conveyor systems be operated without lubricants and even without water, in other words "run dry".

Friction is also a problem in other aspects of conveying systems. For example, conveyor belts are typically supported by a platform or support assembly over which the conveyor belt slides when the conveyor belt is set in motion. Unwanted friction between the conveyor belt and the support assembly due to the collection of debris on the support assembly accelerates wear of both the belt and the support assembly and reduces the efficiency of the operation of the conveyor belt. Another area of concern is the contact which occurs between the containers being conveyed by the conveyor belt and guide rails which are often provided along the sides of the conveyor belt to guide the containers along a desired path. A reduction in friction between the sides of the containers would allow the containers to move at higher speeds with less drag which results in reduced container damage and reduced noise levels.

To this end, a need has long existed for an improved conveyor apparatus that has a low friction conveying surface and a low friction contact surface which provide a stable surface and are easy to maintain and inexpensive to manufacture and operate. It is to such an improved conveyor apparatus that the present invention is directed.

BRIEF DESCRIPTION OF THE DRAWINGS

FIG. 1 is a top plan view of a portion of a conveyor chain constructed in accordance with the present invention.

FIG. 2 is a diagrammatic view of the conveyor chain of the present invention shown disposed about a pair of sprockets.

FIG. 3 is a bottom view of a link member constructed in accordance with the present invention.

FIG. 4 is a perspective view of a spacer used in the connection of one link member to another link member.

FIG. 5 is a side view of the link member of FIG. 3.

FIG. 6 is an enlarged view of the encircled area of FIG. 1 illustrating the nodules on the upper side of the link member.

DETAILED DESCRIPTION

Figure 7:
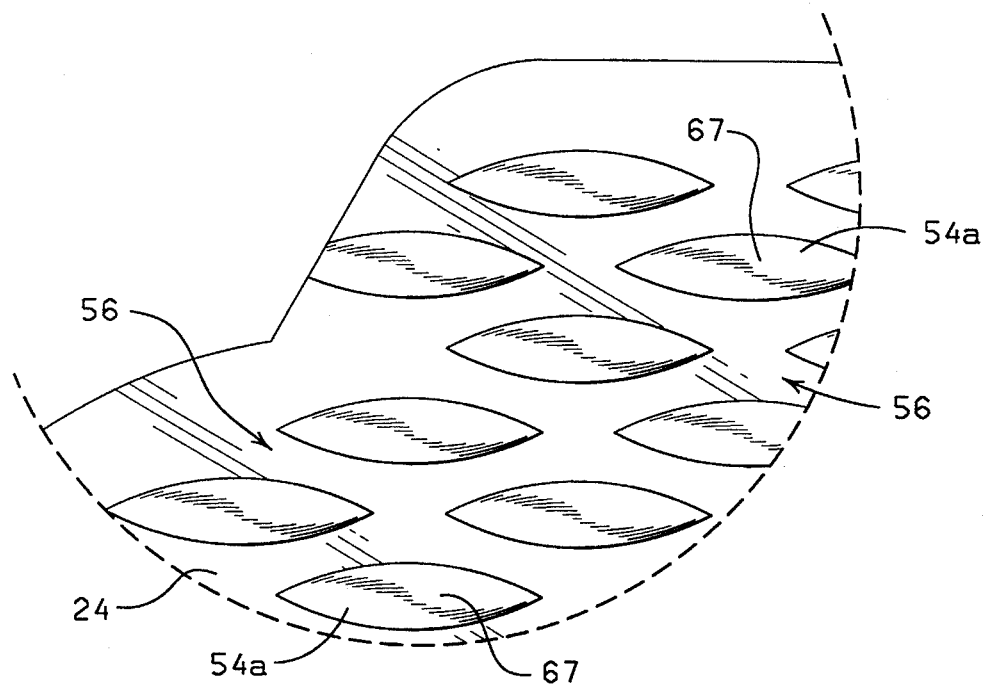
FIG. 7 is an enlarged top view illustrating a nodule having a rounded surface.

Referring now to the drawings, and more particularly to FIGS. 1 and 2, shown is a conveyor chain 10 constructed in accordance with the present invention. The conveyor chain 10 includes a plurality of link members 12. Only two link members 12 of the conveyor chain 10 are shown in FIG. 1. FIG. 2 is a diagrammatic view illustrating the conveyor chain 10 having been formed into a closed loop 14 which is generally extended about a plurality of sprockets 16 and used for transporting objects from one place to another in a manner well known in the art.

The link members 12 illustrated in FIGS. 1–6 form a conveyor chain commonly known as a "knuckle" chain. It will be understood by those of ordinary skill in the art that the description of the knuckle chain set forth herein is for the purpose of this description only in that a knuckle chain is an example of only one type of conveyor chain into which the inventive concept of the present invention can be incorporated.

The link members 12 of the conveyor chain 10 preferably are integrally formed of a plastic or ceramic material, although the link members 12 could be constructed of a metal. Each link member 12 has a forward end 18, a rearward end 20, a lower side 22, and an upper side 24 (FIG. 5). The forward end 18 includes a first link portion 26 having a shaft opening 27 disposed therethrough and a second link portion 28 spaced apart from the first link portion 26 and having a shaft opening 30 which is in alignment with the shaft opening 27 of the first link portion 26. The first and second link portions 26 and 28 define a recess or socket 32 shaped to pivotally receive the rearward end 20 of an adjacent link member 12, as shown in FIG. 1.

The rearward end 20 has a substantially circular exterior configuration and is provided with a circular recess 33 open on the lower side 22 of the link member 12 (FIG. 3). An elongated shaft opening 34 is disposed through the rearward end 20 so as to intersect the recess 33.

In an assembled position, as shown in FIG. 1, the shaft opening 34 of the rearward end 20 is aligned with the shaft openings 27 and 30 of the forward end 18 of the adjacent link member 12 such that the link members 12 are positioned in an end-to-end relationship. Adjacent link members 12 are in turn pivotally interconnected with a link shaft or pin (not shown) disposed through the aligned shaft openings 27, 30 and 34 and secured therein in a conventional manner.

A spacer 38 with a shaft opening 40 as shown in FIG. 4, is disposed in the recess 33 of the rearward end 20 to prevent to-and-fro movement of one link member 12 relative to the adjacent link member 12, while permitting the link members 12 to rotate about an axis 42 (FIG. 5) due to the configuration of elongated shaft opening 34 in the rearward end 20. The link members 12 are also able to pivot about an axis 44 (FIG. 1) defined by the link shaft (not shown). The spacer 38 is rotatably disposed in the recess 33 of the rearward end 20 with the shaft opening 40 generally aligned with the shaft opening 34 disposed through the rearward end 20 of the link member 12.

The rearward end 20 and the spacer 38 are each provided with a curved surface 46 and 48, respectively, which are matingly engagable with the sprockets 16 (FIG. 1) to drive the conveyor chain 10 along a chain track (not shown) in a manner that is well known in the art.

The upper side 24 of each of the link members 12 is shown to be a substantially solid surface extending from the rearward end 20 to the forward end 18 with a portion of the upper side 24 extending laterally from each side of the link member 12 as shown in FIG. 3 to form a pair of wing portions 49 and 50. It will be appreciated, however, that the upper side 24 can be solid, as well as perforated, thereby providing an avenue for debris and liquids to drain from the upper side and reduce the amount of material required to construct the link member. The upper side 24 is arcuately shaped at the forward end 18 to matingly abut the rearward end 20 of the adjacent link member 12. To facilitate pivotation between adjacent link members 12 where the rearward end 20 of one link member 12 is matingly disposed in the recess 32 of the forward end 18 as illustrated in FIG. 1, the upper side 24 is provided with a radial edge 51 (FIG. 5) at the rearward end 20, and the upper side 24 is provided with a corresponding radial edge 52 (FIG. 3) at the forward end 18 shaped to substantially conform with the radial edge 51 of the rearward end 20.

As mentioned above, during some processes it is desirable that the objects carried on the conveyor chain 10 move at a slower speed than the conveyor chain or remain stationary while the conveyor chain 10 continues to move beneath the objects. To effectively reduce the friction between the conveyor chain 10 and an object disposed thereon without the employment of water and soap, or other lubricant, a plurality of nodules 54 are formed on the upper side 24 of each link member 12. Each nodule 54 extends upwardly from the upper side 24 of the link member 12 an equidistance such that the nodules 54 define a planar conveying surface 55 (FIG. 5). The conveying surface 55 frictionally engages an object disposed on the conveying surface 55 when the object is being transported by the conveyor chain 10. In addition, the nodules 54 permit the conveying surface 55 to freely slide relative to the object when the object is disposed on the conveying surface 55 and the object is in a stationary state or moving at a slower speed than the conveyor chain 10.

The nodules 54 are spaced apart to form a plurality of channels 56. The nodules 54 are preferably elongated and oriented in a parallel relationship with respect to a longitudinal axis 57 (FIG. 1) extending from the forward end 18 to the rearward end 20 of the link members 12.

As best illustrated in FIG. 6, each nodule 54 has a base portion 58 integrally connected to the upper side 24 of the link member 12 and an arcuate tapered portion 60. The tapered portion 60 is further defined to have a first arcuate surface 62 and a second arcuate surface 64. The first arcuate surface 62 and the second arcuate surface 64 are angled toward one another such that the intersection of the first arcuate surface 62 and the second arcuate surface 64 defines a thin longitudinally extending edge 66.

The friction between a slower moving or stationary object and the link members 12 is substantially reduced due to the reduced surface area provided by the longitudinally extending edge 66 of the nodules 54, thereby permitting the conveyor chain 10 to slide easily beneath an object when required. The reduction in friction is further facilitated by the formation of the channels 56 between the nodules 54 because debris, including dust, dirt and other contaminants which normally collect directly on the conveying surface and increases friction, collects in the channels 56 and thus does not affect the friction between the conveyor chain 10 and an object disposed thereon. The channels 56 further provide a flow path from the conveying surface 55 for water from production processes, lubricants and other materials that could damage or flaw the labeling or packaging of a product.

Figure 8:
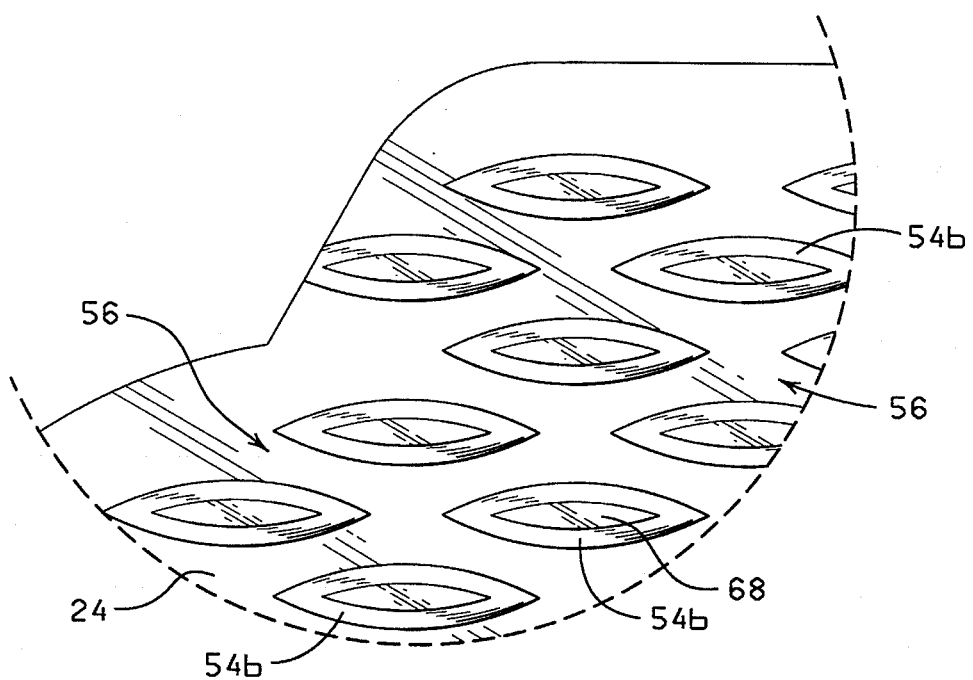
FIG. 8 is an enlarged top view illustrating a nodule having a flat surface.

FIGS. 7 and 8 show alternative configurations of the nodules 54. More specifically, FIG. 7 shows a plurality of nodules 54a having a configuration similar to the nodules 54, except the nodules 54a have a rounded upper surface 67. FIG. 8 shows a plurality of nodules 54b also having a configuration similar to the nodules 54, except the nodules 54b have a flat upper surface 68 rather than a thin edge. It will further be realized that the nodules could be formed in a variety of other geometric configurations including, for example, square, rectangular, elliptical, triangular and star shaped.

Figure 9:
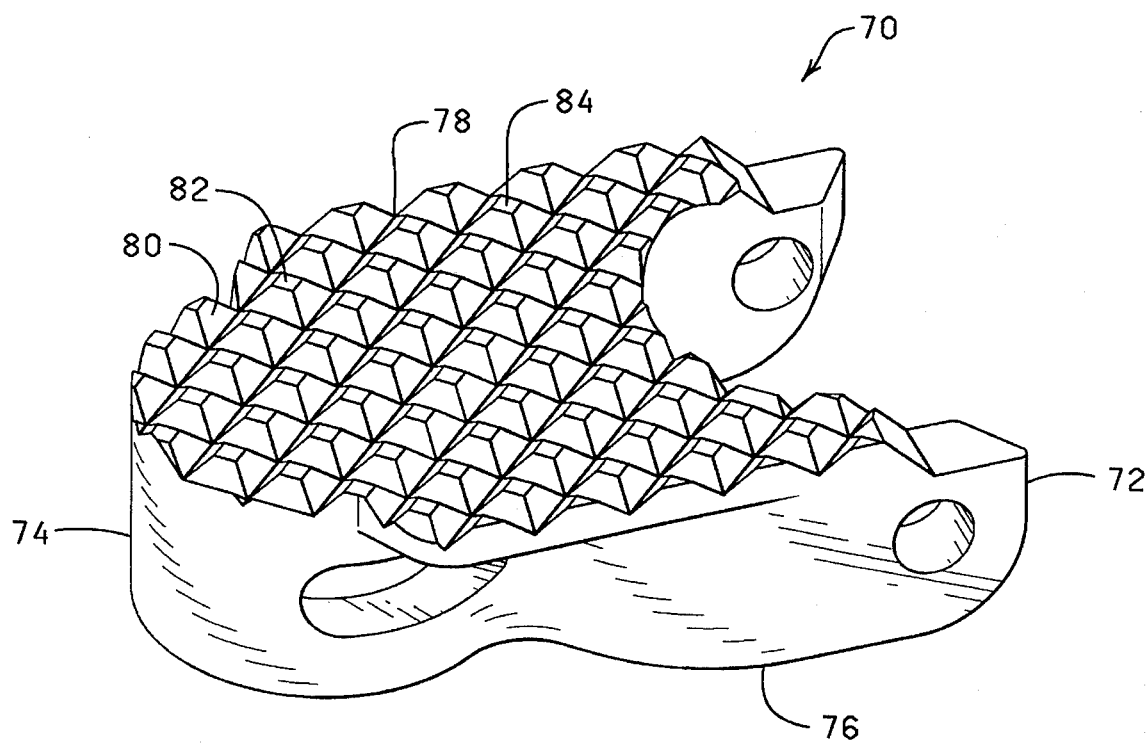
FIG. 9 is a perspective view of another link member constructed in accordance with the present invention.

FIG. 9 illustrates another embodiment of a link member 70 having a forward side 72, a rearward side 74, a lower side 76, and an upper side 78. The upper side 78 has a plurality of grooves 80 which in turn define a plurality of nodules 82 extending from the upper side 78 of the link member 70 and defining a planar conveying surface 84. The grooves 80 can be formed in a criss-cross pattern, as shown, such that the nodules 82 are spaced apart. Alternatively, a lateral or longitudinal oriented pattern can be formed thereby resulting in elongated nodules.

It will be appreciated that the grooves 80 can be formed during the molding process or machined into the link member 70, and the grooves 80 can be configured so as to provide a variety of shapes of nodules including round, oval, square, rectangular or triangular and with a flat surface, rounded surface, or edged surface.

Because of the sliding engagement experienced between the conveying surface and a slower moving or stationary object disposed on the conveyor chain 10, the conveying surface wears over a period of time. To provide an indicator of when replacement of the link members 12 is needed, the link members 12 can be formed in such a manner that the nodules 54, 54a and 54b are formed of a material dyed a color that is in contrast to the color of the upper side 24 of the link member 12. In practice, an operator will know the link members 12 are in need of replacement upon visual inspection when the color forming the nodules 54 is substantially worn away.

Figure 10:
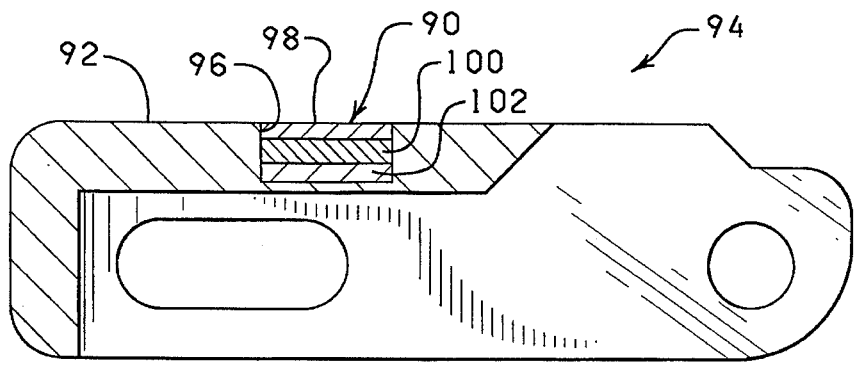
FIG. 10 is a cross section of a link member showing a wear indicator plug inserted therein.

FIG. 10 illustrates a wear indicator plug 90 disposed in an upper side 92 of a link member 94. The upper side 92 of the link member 94 is provided with a plug receiving recess 96. The wear indicator plug 90 is formed of a material having wear characteristics similar to the material used to construct the link member 94. The indicator plug 90 is constructed so as to have two or more colored layers, such as a first colored layer 98, a second colored layer 100, and a third colored layer 102. Each colored layer 98, 100, and 102 has a predetermined thickness and color variation to indicate the degree to which the conveying surface is worn and thus provide an indication of the need to replace either a single link member or a series of link members 94. For example, a first degree of wear will be indicated when the first colored layer 98 is visible, a second degree of wear when the second colored layer 100 is visible, and a third degree of wear when the third colored layer 102 is visible. The indicator plug 90 is secured in the plug receiving recess 96 with an adhesive or by fusing the wear indicator plug 90 to the link member 94 in a conventional manner.

Figure 11:
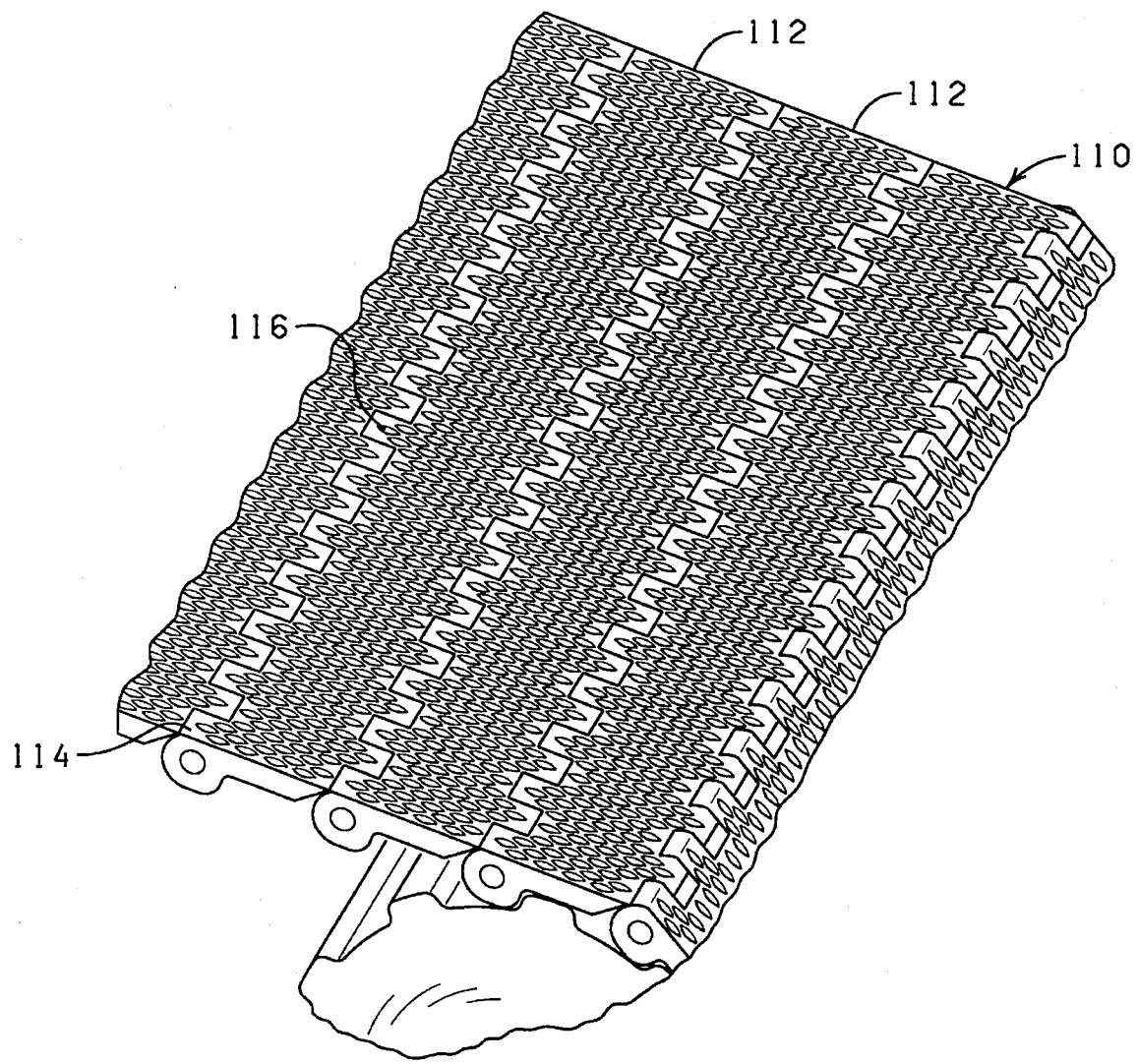
FIG. 11 is a perspective view of a portion of a conveyor belt constructed in accordance with the present invention.

As previously stated, the inventive concept of providing nodules on the upper side of a conveyor apparatus to reduce friction can be employed with other types of conveyor apparatuses. For example, FIG. 11 illustrates a conveyor belt 110, similar to that in U.S. Pat. No. 5,413,211, issued to William G. Faulkner on May 9, 1995, which is specifically incorporated herein by reference. The conveyor belt 110 comprises a plurality of link members 112 pivotally interconnected in an end-to-end relationship. Each link member 112 has an upper side 114 with a plurality of nodules 116 formed thereon and extending upwardly therefrom an equidistance from the upper side 114 of the link member 112 so as to define a planar conveying surface adapted to support an object disposed thereon.

Figure 12:
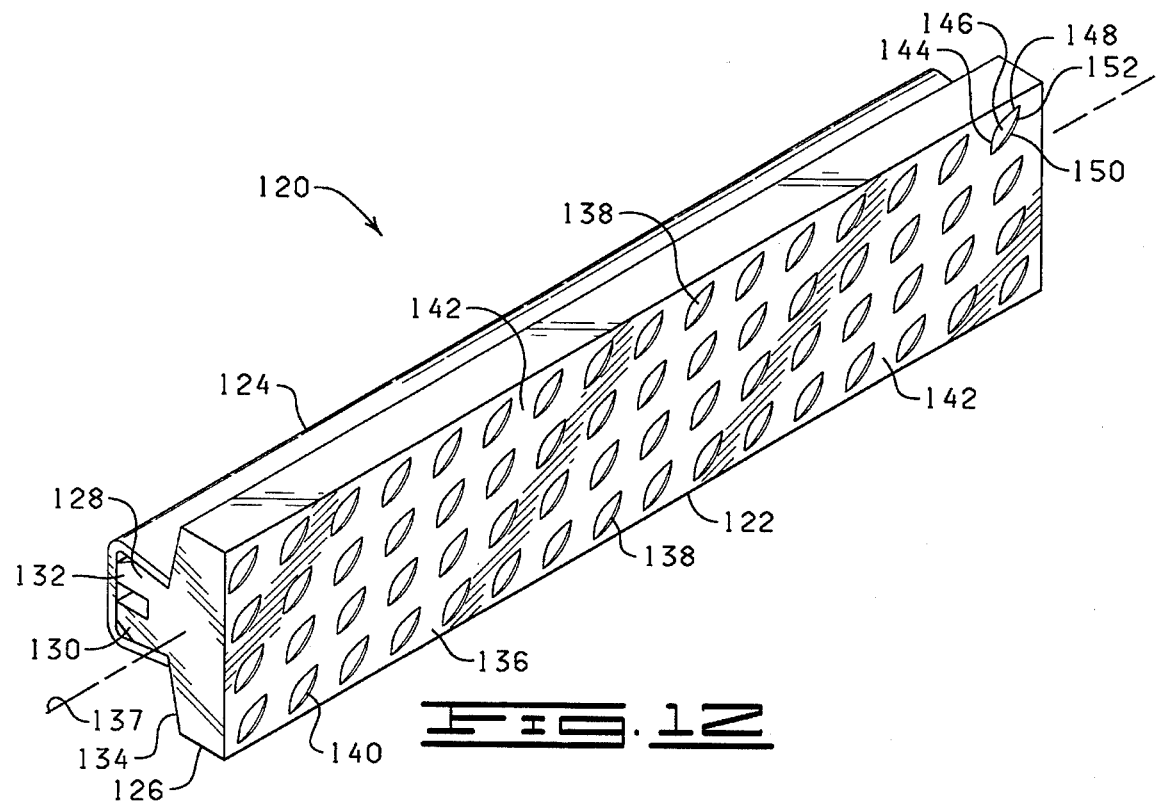
FIG. 12 is a perspective view of a guide member constructed in accordance with the present invention.

Referring now to FIG. 12, a guide or rail member 120, constructed in accordance with the present invention and used in a conveyor system to slidingly support both a conveyor belt and an object being conveyed on a conveyor belt, is illustrated. The guide member 120 includes an insert portion 122 and a sheath 124. The insert portion 122 is preferably constructed of a low friction polymeric material, such as a high molecular weight polyethylene. The insert portion 122 illustrated in FIG. 12 has a T-shaped profile and includes a flange portion 126 with a protrusion 128 extending from the flange portion 126. The protrusion 128 further includes a pair of spaced apart tabs 130 and 132.

The sheath 124 is a U-shaped member preferably constructed of a stainless steel or galvanized carbon steel. The sheath 124 is adapted to fit over the protrusion 128 and provides a solid base for mounting the guide member 120 in a manner described below. The tabs 130 and 132 are inwardly flexible to permit the sheath 124 to be press fitted over the protrusion 128.

The flange portion 126 of the insert portion 122 includes a first side 134 from which the protrusion 128 extends and an opposite second side 136, and is characterized as having a longitudinal axis 137.

To effectively reduce the friction between the guide member 120 and an object, such as a conveyor belt or a container, which comes into sliding contact with the guide member 120, a plurality of nodules 138 are formed on the second side 136 of the flange portion 126. Each nodule 138 extends outwardly from the second side 136 of the flange portion 126 an equidistance such that the nodules 138 define a planar contact surface 140. The nodules 138 permit the contact surface 140 to freely slide relative to the object when an object comes into contact with the second side 136 of the flange portion 126.

The nodules 138 are elongated and spaced apart to form a plurality of channels 142. As illustrated in FIG. 12, the nodules 138 are angularly oriented with respect to longitudinal axis 137 of the flange portion 126 at an angle of from about 5 to 45 degrees so that the channels 142 lead to the sides of the guide member 120. This angular arrangement facilitates the removal of debris from the guide member 120 by allowing the debris to be pushed to the sides of the guide member 120 by the movement of a conveyor belt or container during operation of the conveyor system. Alternatively, the nodules 138 can be oriented in a parallel relationship with respect to a longitudinal axis 137 or in a combination of angular orientation and parallel orientation.

The nodules 138 are illustrated in FIG. 12 as having a base portion 144 integrally connected to the second side 136 of the guide member 120 and an arcuate tapered portion 146. The tapered portion 146 is further defined to have a first arcuate surface 148 and a second arcuate surface 150. The first arcuate surface 148 and the second arcuate surface 150 are angled toward one another such that the intersection of the first arcuate surface 148 and the second arcuate surface 150 defines a thin longitudinally extending edge 152. However, like the nodules 54 described above in reference to the link members 12, the nodules 138 can also be configured in a variety of other shapes including round, oval, square, rectangular, or triangular and with a flat surface, a rounded surface, or edged surface. It will also be understood that the nodules 138 can be formed by cutting grooves on the second side 136 of the flange portion 126 in a manner similar to that described above in reference to FIG. 9. Those of ordinary skill in the art will also realize that guide members are manufactured in a variety of shapes and sizes and that the guide member 120 described above is for the purpose of this description only. In turn, the inventive concept of providing a guide member with a plurality of nodules to form a low friction contact surface is equally applicable to other types and shapes of guide members not specifically described herein.

Because of the sliding engagement experienced between the contact surface 140 and a conveyor belt or a container, the contact surface 140 wears over a period of time. To provide an indicator of when replacement of the guide members 120 is needed, the guide members 120 can be formed in such a manner that the nodules 138 are formed of a material dyed a color that is in contrast to the color of the remainder of the guide member 120. In practice, an operator will know the guide members 120 are in need of replacement upon visual inspection when the color forming the nodules 138 is substantially worn away.

Figure 13:
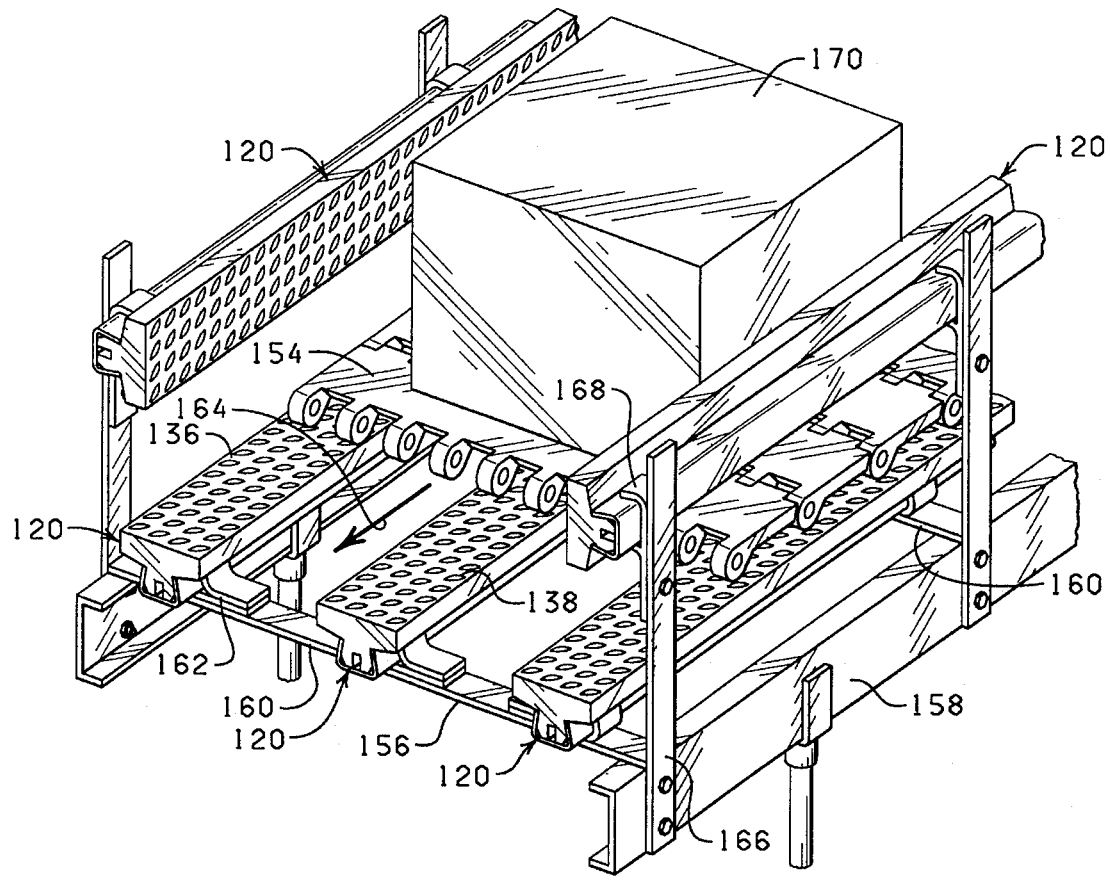
FIG. 13 is a partially cutaway, perspective view of a conveyor belt operably positioned on a conveyor belt support assembly which utilizes the support member of FIG. 12 and a container disposed on the conveyor belt and between a pair of the support members of FIG. 12 utilized as guide rails.

Guide members, such as the guide member 120 described above, are typically used in conveyor systems as side rails and as support members on wear beds or slider beds. To this end, FIG. 13 depicts a conveyor belt 154 disposed on a support assembly 156 wherein a plurality of the guide members 120 are used to form a wear bed or slider bed upon which the conveyor belt 154 is disposed. The support assembly 156 includes a pair of conveyor frame members 158 oriented in a parallel, spaced apart relation and a plurality of cross members 160 mounted between the frame members 158. The guide members 120 are mounted to the cross members 160 with a connecting member, such as a clamp 162. It will be understood by those skilled in the art that the support assembly 156 and the arrangement of the guide members 120 illustrated in FIG. 13 is for illustrative purposes only and that it is well known in the art that the guide members 120 can be arranged in a multiplicity of ways in forming wear beds or slider beds.

FIG. 13 also illustrates the guide members 120 used as side rails. More specifically, the guide members 120 are shown mounted on each side of a conveyor belt 154 parallel to a travel path (designated by arrow 164) of the conveyor belt 154. The guide members 120 are shown to be mounted to the frame members 158 in a conventional manner with a bracket 166 and a connector 168. The guide members 120 are mounted relative to the conveyor belt 154 such that the contact surface 140 of the guide members 120 is slidingly engagable with an object, such as a container 170, so as to provide lateral support to the container 170 and guide the container 170 along the travel path 164. As with the guide members 120 used to form a wear bed, it will be appreciated that other side rail arrangements are known in the art and that FIG. 13 merely depicts one example of such arrangements.

In operation, the conveyor belt 154 is extended about a plurality of powered sprockets (as substantially shown in FIG. 2) and supported between the sprockets by the support assembly 156. When the conveyor belt 154 is set in motion, the conveyor belt 154 slidingly engages the guide members 120 that form the wear bed and the container 170 slidingly contacts the guide members 120 that form the side rails. The friction between the conveyor belt 154 and the support assembly 156 and the friction between the container 170 and the side rails is substantially reduced due to the reduced surface area provided by the nodules 138, thereby permitting the conveyor belt 154 to slide easily over the wear bed and the container 170 to slide easily over the side rails. The reduction in friction is further facilitated by the formation of the channels 142 between the nodules 138 because debris, including dust, dirt and other contaminants which normally collects directly on the wear bed and the side rail and thus increases friction, collects in the channels 142 and thus does not affect the friction between the conveyor belt 154 and the guide members 120 and the container 170 and the side rails.

Figure 14:
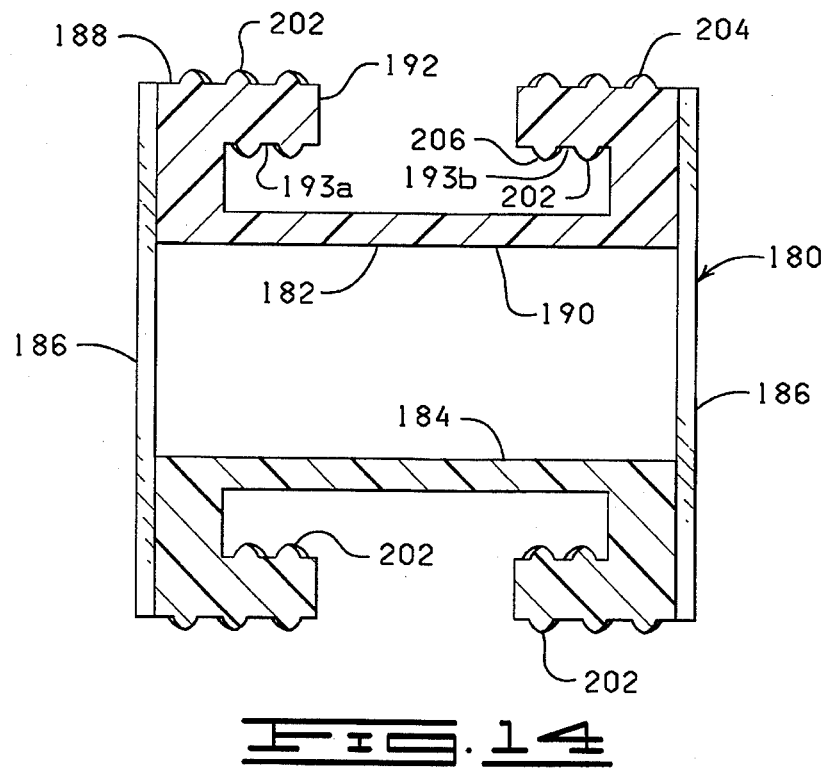
FIG. 14 is a cross sectional view of a conveyor chain track constructed in accordance with the present invention.
Figure 15:
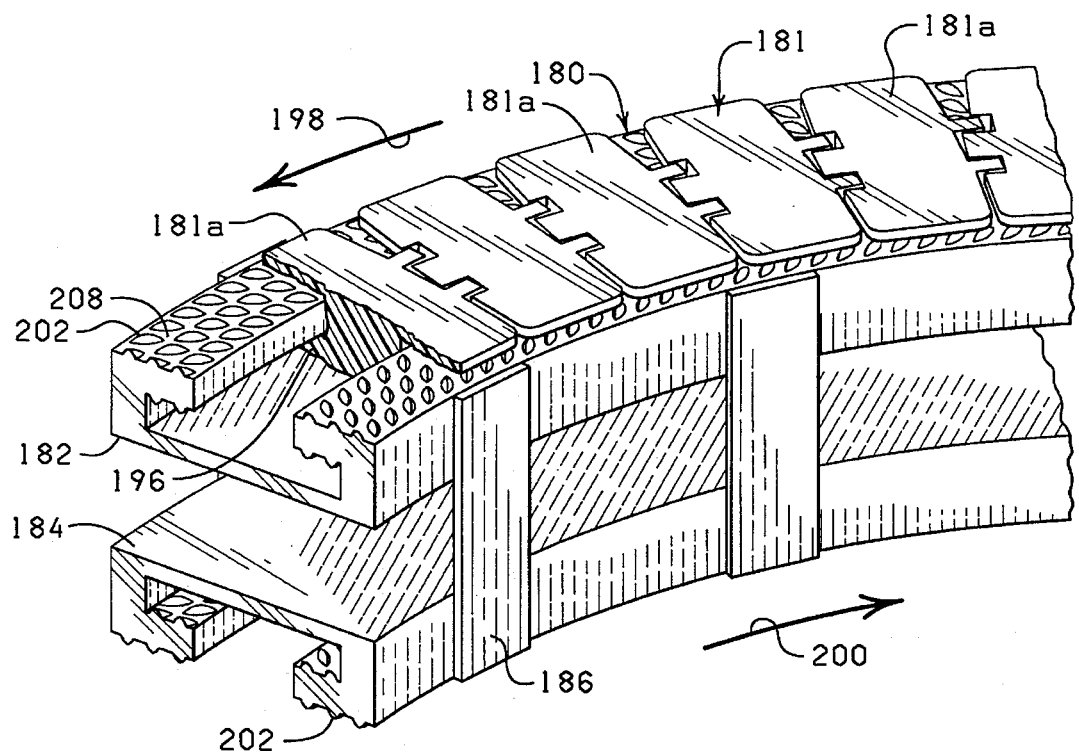
FIG. 15 is a partial cutaway, perspective view of a portion of the module of FIG. 14 showing a conveyor chain disposed therein.

FIGS. 14 and 15 illustrate another example of a guide member 180 constructed in accordance with the present invention. More specifically, the guide member 180 illustrated in FIG. 14 is known as a "tab style" modular belt track and is primarily used in side flexing conveyor chain applications, such as side flexing chain 181 (FIG. 15) which is comprised of a plurality of interconnected link members 181a. The guide member 180 includes a carry module 182 which is for guiding and supporting the conveyor chain when the conveyor chain 181 is positioned for carrying an object from one location to another location and a return module 184 which is for guiding and supporting the conveyor chain 181 when the conveyor chain 181 is looped under the carry module 182. The carry module 182 and the return module 184 are typically arranged in a stacked, parallel relation and connected with a pair of brackets 186. The carry module 182 and the return module 184 are identical in configuration, thus only the carry module 182 will be described in detail below.

The carry module 182 includes an upper surface 188, a lower surface 190 and a chain guide way 192 which includes a pair of tab engaging surfaces 193a and 193b and in which the conveyor chain 181 is configured to be slidingly retained. That is, each link member 181a of the conveyor chain 181 is provided with a pair of tabs 196 (only a portion of one being depicted in FIG. 14) which are matingly positioned in the chain guide way 192 such that the conveyor chain 181 engages the carry module 182 along the upper surface 188 and the upper tab engaging surfaces 193a and 193b in a conventional manner to retain the conveyor chain 181 as the conveyor chain 181 travels on the carry module 182 along a carry travel path represented by the arrow 198. Similarly, the tabs 196 of the conveyor chain 181 serve to retain the conveyor chain 181 in the return module 184 as the conveyor chain travels on the return module 184 along a return travel path represented by the arrow 200.

To effectively reduce the friction between the guide member 180 and the conveyor chain 181, a plurality of nodules 202 are formed on the upper side 188 of the carry module 182 and the tab engaging surfaces 193a and 193b. The nodules 202 on the upper side 188 extend outwardly from the upper side 188 an equidistance such that the nodules 202 define a planar contact surface 204, and the nodules 202 on the tab engaging surfaces 193a and 193b extend outwardly from the tab engaging surfaces 193a and 193b an equidistance such that the nodules 202 define a planar contact surface 206. The nodules 202 permit the conveyor chain 181 to freely slide relative to the contact surfaces 204 and 206 when the conveyor chain 181 is in motion.

The nodules 202 are illustrated in FIGS. 14 and 15 as being elongated and spaced apart to form a plurality of channels 208. As best illustrated in FIG. 15, the nodules 202 are angularly oriented in an outward direction with respect to the longitudinal axis of the carry module 182 at an angle of from about 5 to 45 degrees so that the channels 208 lead to the sides of the guide member 180. This angular arrangement facilitates the removal of debris from the guide member 180 by allowing the debris to be pushed to the sides of the guide member 180 by a conveyor belt or container during operation of the conveyor system or during normal maintenance. Alternatively, the nodules 202 can be oriented in a parallel relationship with respect to a longitudinal axis of the guide member 180 or in a combination of angular orientation and parallel orientation.

The nodules 202 are shown herein to have an elongated shape with an arcuate tapered portion defining a thin longitudinally extending edge as described above with reference to FIGS. 12 and 13. However, it will be appreciated that the nodules 202 can also be configured in a variety of other shapes including round, oval, square, rectangular, or triangular and with a flat surface, a rounded surface, or edged surface. It will also be understood that the nodules 202 can be formed by cutting grooves into the carry module 182 in a manner similar to that described above in reference to FIG. 9.

Because of the sliding engagement experienced between the contact surfaces 204 and 206 and the conveyor chain 181, the contact surfaces 204 and 206 wear over a period of time. To provide an indicator of when replacement of the carry module 182 and the return module 184 is needed, the carry module 182 and the return module 184 can be formed in such a manner that the nodules 202 are formed of a material dyed a color that is in contrast to the color of the remainder of the carry module 182 and the return module 184. In practice, an operator will know the carry module 182 and the return module 184 are in need of replacement upon visual inspection when the color forming the nodules 202 is substantially worn away.

Figure 16:
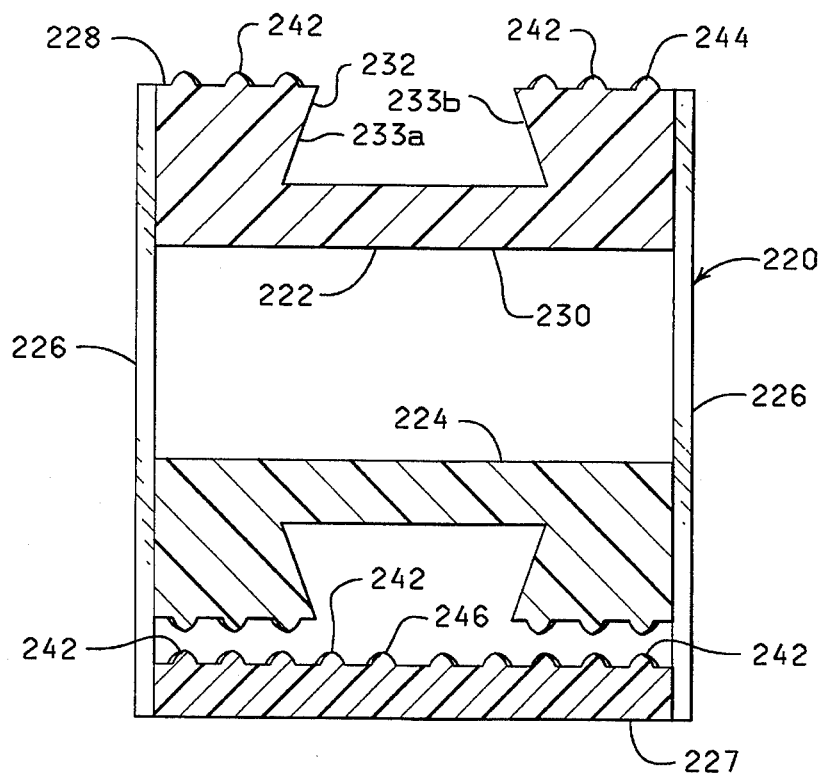
FIG. 16 is a cross sectional view of another embodiment of a conveyor chain track constructed in accordance with the present invention.
Figure 17:
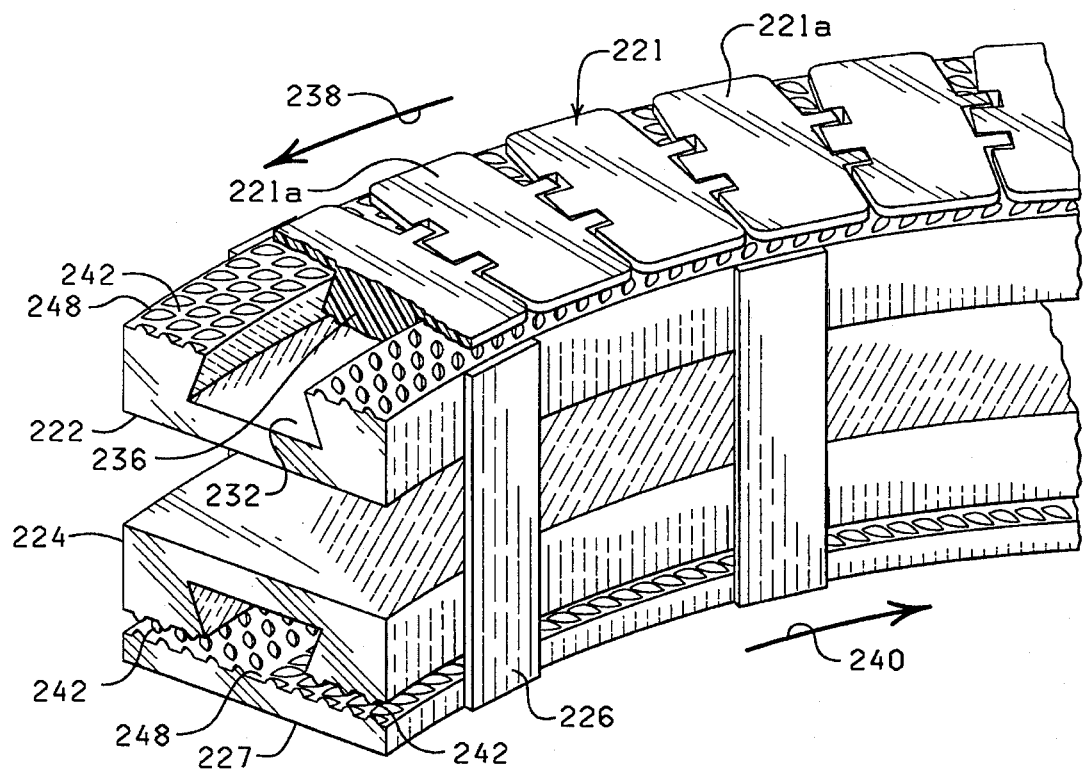
FIG. 17 is a partial cutaway, perspective view of a portion of the module of FIG. 16 showing a conveyor chain disposed therein.

FIGS. 16 and 17 illustrate another example of a guide member 220 constructed in accordance with the present invention. More specifically, the guide member 220 illustrated in FIGS. 16 and 17 is known as a "bevel style" modular belt track and is primarily used in side flexing conveyor chain applications, such as side flexing chain 221 (FIG. 17) which is comprised of a plurality of interconnected link members 221a. The guide member 220 includes a carry module 222 which is for guiding and supporting the conveyor chain when the conveyor chain 221 is positioned for carrying an object from one location to another location and a return module 224 which is for guiding and supporting the conveyor chain 221 when the conveyor chain 221 loops under the carry module 222. The carry module 222 and the return module 224 are typically arranged in a stacked, parallel relation and connected with a pair of brackets 226. The carry module 222 and the return module 224 are identical in configuration except that the return module 224 is used in conjunction with a support plate 227, thus only the carry module 222 will be described in detail below.

The carry module 222 includes an upper surface 228, a lower surface 230 and a chain guide way 232 partially formed by a pair of beveled surfaces 233a and 233b and in which the conveyor chain 221 is configured to be slidingly retained. That is, each link member 221a of the conveyor chain 221 is provided with a beveled portion 236 which is matingly positioned in the chain guide way 232 such that the conveyor chain 221 engages the carry module 222 along the upper surface 228 and the beveled surfaces 233a and 233b in a conventional manner to retain the conveyor chain 221 as the conveyor chain 221 travels on the carry module 222 along a carry travel path represented by the arrow 238. Similarly, the beveled portion 236 of the conveyor chain 221 serves to retain the conveyor chain 221 in cooperation with the support plate 227 in the return module 224 as the conveyor chain 221 travels on the return module 224 along a return travel path represented by the arrow 240.

To effectively reduce the friction between the guide member 220 and the conveyor chain 221, a plurality of nodules 242 are formed on the upper side 228 of the carry module 222 and the support plate 227. The nodules 242 on the upper side 228 extend outwardly from the upper side 228 an equidistance such that the nodules 242 define a planar contact surface 244, and the nodules 242 on the support plate 227 extend outwardly therefrom an equidistance such that the nodules 242 define a planar contact surface 246. The nodules 242 permit the conveyor chain 221 to freely slide relative to the contact surfaces 244 and 246 when the conveyor chain 221 is in motion.

The nodules 242 are illustrated in FIGS. 16 and 17 as being elongated and spaced apart to form a plurality of channels 248. As best illustrated in FIG. 15, the nodules 242 are angularly oriented in an outward direction with respect to the longitudinal axis of the carry module 222 and the support plate 227 at an angle of from about 5 to 45 degrees so that the channels 248 lead to the sides of the guide member 220. This angular arrangement facilitates the removal of debris from the guide member 220 by allowing the debris to be pushed to the sides of the guide member 220 by a conveyor belt or container during operation of the conveyor system or during normal maintenance. Alternatively, the nodules 242 can be oriented in a parallel relationship with respect to the longitudinal axis of the guide member 220 or in a combination of angular orientation and parallel orientation.

The nodules 242 are shown herein to have an elongated shape with an arcuate tapered portion defining a thin longitudinally extending edge as described above with reference to FIGS. 12 and 13. However, it will be appreciated that the nodules 242 can also be configured in a variety of other shapes including round, oval, square, rectangular, or triangular and with a flat surface, a rounded surface, or edged surface. It will also be understood that the nodules 242 can be formed by cutting grooves into the carry module 222 in a manner similar to that described above in reference to FIG. 9.

Because of the sliding engagement experienced between the contact surfaces 244 and 246 and the conveyor chain 221, the contact surfaces 244 and 246 wear over a period of time. To provide an indicator of when replacement of the carry module 222, the return module 224, and the support plate 227 is needed, each can be formed in such a manner that the nodules 242 are formed of a material dyed a color that is in contrast to the color of the remainder of the carry module 222, the return module 224, and the support plate 227. In practice, an operator will know each component is in need of replacement upon visual inspection when the color forming the nodules 242 is substantially worn away.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed:

1. A conveyor apparatus for transporting an object, comprising:

a conveyor belt;

conveyor belt guide means for guiding and supporting at least a portion of the conveyor belt, the conveyor belt guide means comprising at least one conveyor belt guide member adapted for sliding engagement with the conveyor belt, the guide member having a plurality of nodules extending therefrom so as to define a low friction contact surface for reducing drag between the conveyor belt and the conveyor belt guide member when the conveyor belt is in sliding engagement with the conveyor belt guide member; and means for actuating the conveyor belt such that the conveyor belt slides over the conveyor belt guide member of the conveyor belt guide means.

2. The apparatus of claim 1 wherein each of the nodules has a base portion connected to the conveyor belt guide member and a tapered portion having a first surface and a second surface, the first surface and the second surface being angled toward one another such that the intersection of the first surface and the second surface defines a thin longitudinally extending edge.

3. The apparatus of claim 1 wherein the nodules are spaced apart so as to form a plurality of channels for collecting debris therein and providing a fluid flow path across the conveyor belt guide member for removal of collected debris.

4. The apparatus of claim 3 wherein the conveyor belt is moved along a travel path, and wherein the nodules are configured such that the channels formed therebetween are angularly disposed relative to the travel path of the conveyor belt so as to facilitate removal of debris from the conveyor belt guide member.

5. The apparatus of claim 4 wherein the channels are disposed at an angle of from about 5 to 45 degrees relative to the travel path of the conveyor belt.

6. The apparatus of claim 1 wherein the nodules are dyed a color in contrast to the color of the remainder of the conveyor belt guide means so as to provide a visual indication of when the nodules are worn.

7. The apparatus of claim 1 further comprising:

object guide means for guiding and supporting the object disposed on the conveyor belt while the conveyor belt is in motion, the object guide means comprising at least one object guide member adapted for sliding engagement with the object, the object guide member having a plurality of nodules extending therefrom so as to define a low friction contact surface for reducing drag between the object and the object guide member when the object is in sliding engagement with the object guide member.

8. The apparatus of claim 7 wherein the conveyor belt is moved along a travel path, and wherein each of the nodules of the object guide member has an elongated configuration and each nodule is oriented in a substantially parallel relationship with respect to the travel path of the conveyor belt.

9. The apparatus of claim 7 wherein each of the nodules has a base portion connected to the object guide member and a tapered portion having a first surface and a second surface, the first surface and the second surface being angled toward one another such that the intersection of the first surface and the second surface defines a thin longitudinally extending edge.

10. The apparatus of claim 7 wherein the nodules are spaced apart so as to form a plurality of channels for collecting debris therein and providing a fluid flow path across the object guide member.

11. The apparatus of claim 7 wherein the nodules are dyed a color in contrast to the color of the remainder of the object guide so as to provide a visual indication of when the nodules are worn.

12. A conveyor apparatus for transporting an object, comprising:

a conveyor belt;

object guide means for guiding and supporting the object disposed on the conveyor belt while the conveyor belt is in motion, the object guide means comprising at least one object guide member adapted for sliding engagement with the object, the object guide member having a plurality of nodules extending therefrom so as to define a low friction contact surface for reducing drag between the object and the object guide member when the object is in sliding engagement with the object guide member; and means for actuating the conveyor belt.

13. The apparatus of claim 12 wherein the conveyor belt is moved along a travel path, and wherein each of the nodules of the object guide member has an elongated configuration and each nodule is oriented in a substantially parallel relationship with respect to the travel path of the conveyor belt.

14. The apparatus of claim 12 wherein each of the nodules has a base portion connected to the object guide member and a tapered portion having a first surface and a second surface, the first surface and the second surface being angled toward one another such that the intersection of the first surface and the second surface defines a thin longitudinally extending edge.

15. The apparatus of claim 12 wherein the nodules are spaced apart so as to form a plurality of channels for collecting debris therein and providing a fluid flow path across the object guide member.

16. The apparatus of claim 12 wherein the nodules are dyed a color in contrast to the color of the remainder of the object guide so as to provide a visual indication of when the nodules are worn.

17. The apparatus of claim 12 further comprising:

conveyor belt guide means for guiding and supporting at least a portion of the conveyor belt, the conveyor belt guide means comprising at least one conveyor belt guide member adapted for sliding engagement with the conveyor belt, the guide member having a plurality of nodules extending therefrom so as to define a low friction contact surface for reducing drag between the conveyor belt and the conveyor belt guide member when the conveyor belt is in sliding engagement with the conveyor belt guide member.

18. The apparatus of claim 17 wherein each of the nodules has a base portion connected to the conveyor belt guide member and a tapered portion having a first surface and a second surface, the first surface and the second surface being angled toward one another such that the intersection of the first surface and the second surface defines a thin longitudinally extending edge.

19. The apparatus of claim 17 wherein the nodules are spaced apart so as to form a plurality of channels for collecting debris therein and providing a fluid flow path across the conveyor belt guide member for removal of collected debris.

20. The apparatus of claim 19 wherein the conveyor belt is moved along a travel path, and wherein the nodules are configured such that the channels formed therebetween are angularly disposed relative to the travel path of the conveyor belt so as to facilitate removal of debris from the conveyor belt guide member.

21. The apparatus of claim 20 wherein the channels are disposed at an angle of from about 5 to 45 degrees relative to the travel path of the conveyor belt.

22. The apparatus of claim 17 wherein the nodules are dyed a color in contrast to the color of the remainder of the conveyor belt guide means so as to provide a visual indication of when the nodules are worn.

23. An improved conveyor apparatus of the type in which an object is transported on a conveyor belt and which at least one of the object and the conveyor belt slidingly engages a contact surface of a guide member, the improvement comprising:

a plurality of spaced apart nodules extending from the guide member so as to define the contact surface of the guide member and thereby reduce drag between the contact surface of the guide member and one of the object and the conveyor belt when the conveyor belt is in motion.

24. The improvement of claim 23 wherein each of the nodules of the guide member has an elongated configuration.

25. The improvement of claim 24 wherein each of the nodules has a base portion connected to the object guide member and a tapered portion having a first surface and a second surface, the first surface and the second surface being angled toward one another such that the intersection of the first surface and the second surface defines a thin longitudinally extending edge.

26. The improvement of claim 23 wherein the nodules are spaced apart so as to form a plurality of channels for collecting debris therein and providing a fluid flow path across the guide member.

27. The improvement of claim 23 wherein the nodules are dyed a color in contrast to the color of the remainder of the guide member so as to provide a visual indication of when the nodules are worn.

* * * * *